(12) United States Patent
Lobean et al.

(10) Patent No.: US 8,854,182 B2
(45) Date of Patent: *Oct. 7, 2014

(54) OPENING MANAGEMENT THROUGH GAIT DETECTION

(75) Inventors: Dorathea E. Lobean, Raleigh, NC (US); Adrian X. Rodriguez, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 48 days.

This patent is subject to a terminal disclaimer.

(21) Appl. No.: 13/524,785

(22) Filed: Jun. 15, 2012

(65) Prior Publication Data

US 2012/0321136 A1    Dec. 20, 2012

Related U.S. Application Data

(63) Continuation of application No. 13/160,490, filed on Jun. 14, 2011.

(51) Int. Cl.
*B60R 25/00* (2013.01)
*G05B 19/00* (2006.01)
*H04B 1/00* (2006.01)
*G06K 9/00* (2006.01)
*G07C 9/00* (2006.01)

(52) U.S. Cl.
CPC ........ *G06K 9/00348* (2013.01); *G07C 9/00126* (2013.01)

USPC .......... 340/5.7; 340/5.53; 340/5.83; 382/103; 382/115

(58) Field of Classification Search
CPC ........... G06K 9/00221; G06K 9/00348; G07C 9/00126
USPC .................. 340/5.7, 5.53, 5.83; 382/103, 115
See application file for complete search history.

(56) References Cited

U.S. PATENT DOCUMENTS

| | | | | |
|---|---|---|---|---|
| 2002/0028003 | A1* | 3/2002 | Krebs et al. | 382/115 |
| 2004/0228503 | A1* | 11/2004 | Cutler | 382/103 |
| 2006/0158307 | A1* | 7/2006 | Lee et al. | 340/5.53 |

* cited by examiner

*Primary Examiner* — Nabil Syed
*Assistant Examiner* — Adnan Aziz
(74) *Attorney, Agent, or Firm* — Steven M. Greenberg, Esq.; CRGO Law

(57) ABSTRACT

Embodiments of the present invention provide a method, system and computer program product for managing an opening through gait recognition. In an embodiment of the invention, a method for managing an opening through gait recognition is provided. The method includes capturing imagery, for example through the use of a Web cam, of a moving object as the moving object approaches an automated door. The method additionally, includes determining from the captured imagery a presence or absence of a gait of the moving object. Finally, the method includes managing an automated opening of the door according to the determined presence or absence of a gait of the moving object.

5 Claims, 1 Drawing Sheet

OPENING MANAGEMENT THROUGH GAIT DETECTION

CROSS-REFERENCE TO RELATED APPLICATIONS

This application is a Continuation of U.S. application Ser. No. 13/160,490, filed Jun. 14, 2011, currently pending, the entirety of which is incorporated herein by reference.

BACKGROUND OF THE INVENTION

1. Field of the Invention

The present invention relates to biometrics and more particularly to gait detection.

2. Description of the Related Art

The field of biometrics refers to methodologies used to uniquely recognize people based upon one or more intrinsic physical or behavioral traits. In computer science, in particular, biometrics is used as a form of identity access management and access control. Biometrics also have been used to identify individuals traveling in groups of people while remaining under surveillance. Biometric characteristics can be divided into two main classes: physiological and behavioral. Physiological biometric characteristics are related to the shape of the body and include fingerprint, face recognition, DNA, palm print, hand geometry, iris recognition, and odor/scent. Behavioral biometric characteristics, in turn, are related to the behavior of a person. Examples include typing rhythm, gait, and voice.

Biometric gait recognition refers to the recognition of a person from the manner in which the person walks. Gait recognition has become a recent attractive topic in biometric research and has been categorized into three groups based upon the way in which gait is sensed: machine vision, floor sensor and wearable sensor. In respect to machine vision, gait is captured using one or more video cameras from a distance. Video and image processing techniques are employed to extract gait features for recognition purposes. For example, stride and cadence has been used for both person identification and also verification. By comparison, static body parameters such as the height, the distance between head and pelvis, the maximum distance between pelvis and feet, and the distance between feet has been used for gait recognition.

Most of the machine vision based gait recognition algorithms are based upon the human silhouette. In particular, when using the human silhouette to detect gait, the image background of a person walking is removed and the silhouette of the person is extracted and analyzed for recognition. Thereafter, the average silhouettes appearing over a gait cycle can be computed and the Euclidean distance between two averaged silhouettes can be extracted to compute similarity of gaits. While gait recognition principally relates to the identification of a particular individual, the fundamental assumption of gait recognition remains that a human being walking is the subject of the gait recognition analysis.

BRIEF SUMMARY OF THE INVENTION

Embodiments of the present invention address deficiencies of the art in respect to gait recognition and provide a novel and non-obvious method, system and computer program product for managing an opening through gait recognition. In an embodiment of the invention, a method for managing an opening through gait recognition is provided. The method includes capturing imagery, for example through the use of a Web cam, of a moving object as the moving object approaches an automated door. The method additionally, includes determining from the captured imagery a presence or absence of a gait of the moving object. Finally, the method includes managing an automated opening of the door according to the determined presence or absence of a gait of the moving object.

In one aspect of the embodiment the presence or absence of a gait of the moving object is determined by computing changes in a vertical position of the moving object from frame to frame in the imagery. In another aspect of the embodiment, the automated door is opened in response to determining an absence of gait of the moving object. Finally, in yet another aspect of the embodiment, the automated door is opened more quickly in response to determining a fast gait of the moving object and more slowly in response to determining a slow gait of the moving object.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for managing an opening through gait recognition, including supporting accessibility of the opening. In accordance with an embodiment of the invention, a moving image can be detected in proximity to an opening. The presence or absence of a gait can be determined with respect to the moving image. Thereafter, a first action for the opening can be undertaken in response to determining an absence of a gait in the moving image. Otherwise, a second action that differs from the first action for the opening can be undertaken in response to determining a presence of a gait for the moving image. For example, in response to determining an absence of a gait, the moving image can be presumed to be a person in a wheelchair or scooter and a door for the opening can be automatically opened to allow the wheelchair or scooter to pass through. However, in response to determining the presence of a gait, the moving image can be presumed to be a walking person and the door for the opening can remain closed albeit manually operable by the walking person. In this way, the door need not be opened automatically needlessly for every sensed moving image.

Figure 1:
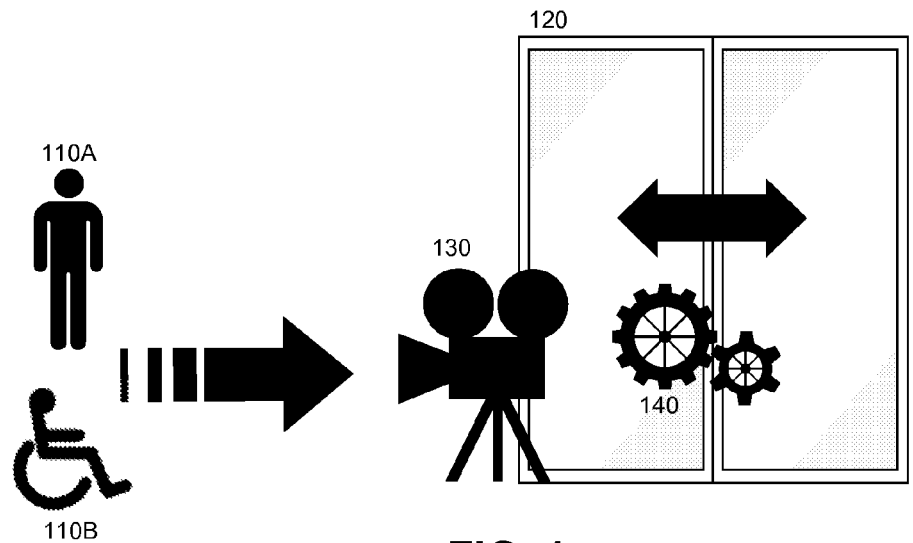
FIG. 1 is a pictorial illustration of a process for managing an opening through gait recognition.

In further illustration, FIG. 1 pictorially shows a process for managing an opening through gait recognition. As shown in FIG. 1, a moving object 110A, 110B can be detected as the moving object 110A, 110B approaches an automated door 120. An image acquisition device 130, for example a video camera, can capture different images at different times of the moving object 110A, 110B and door management logic 140 responsive to gait detection can detect the presence or absence of a gait in the movement of the moving object 110A, 110B as the moving object 110A, 110B approaches the door 120. If a gait is detected, the moving object 110A can be presumed to be a person walking towards the automated door 120 in which case it can be presumed that the person walking towards the automated door 120 is able to manually operate the door 120. However, if a gait is not detected, the moving object 110B can be presumed to be a disabled person moving through the assistance of a wheeled vehicle such as a scooter or wheelchair. In that instance, the door management logic 140 can activate the automated door 120 to automatically open to permit the moving object 110B to pass through.

Figure 2:
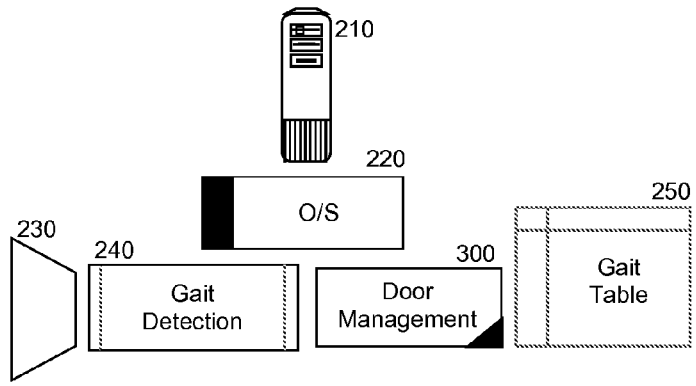
FIG. 2 is a schematic illustration of an opening management data processing system configured for managing an opening through gait recognition; and, FIGS. 3A and 3B, taken together, are a flow chart illustrating a process for managing an opening through gait recognition.

The process described in connection with FIG. 1 can be implemented in an opening management data processing system. In yet further illustration, FIG. 2 schematically shows an opening management data processing system configured for managing an opening through gait recognition. The system can include a host computer 210 with at least one processor and memory supporting the execution of an operating system 220. The operating system 220 in turn can host the execution of a gait detection computer program 240 processing image data received from a camera 230, such as a "Web cam" or other such charge coupled device (CCD) based camera, to detect and determine a gait of a moving object shown by the image data.

For example, the vertical positioning of a silhouette of a person in the image data can be analyzed to determine an estimated height of the person and changes in the vertical positioning of the silhouette can be compared from frame to frame relative to a background image to compute a gait for the person. Once the height of a person can be estimated, the changes in vertical positioning can be referenced for the height of the person in a table 250 to identify an estimated gait, with larger changes in vertical positioning reflecting a faster gait and smaller changes in the vertical positioning reflecting a slower gait (and no changes in vertical positioning reflecting no gait and implicating a disabled person on a wheeled vehicle).

Door management module 300 can be coupled to the gait detection computer program 240. The door management module 300 can include program code that when executed in the memory of the host computer 210 can be enabled to managing the automated opening and closing of an opening such as a door in response to the detection of the presence or absence of a gait in a moving target imaged by the camera 230. For instance, the program code can be enabled to activate the opening of an automated door responsive to detecting an absence of a gait by the gait detection computer program 240. As another option, detecting a faster gait can result in the program code being enabled to activate the opening and closing of the automated door more quickly than when detecting a slower gait.

Figure 3A:
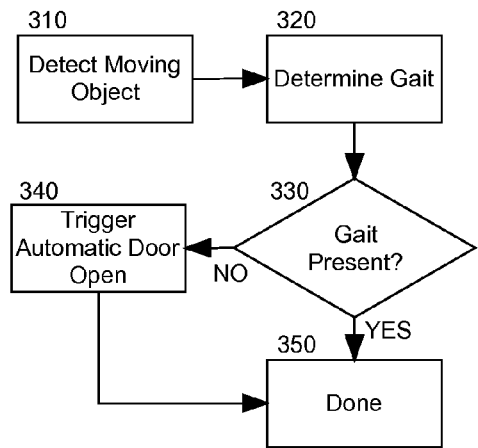
Figure 3B:
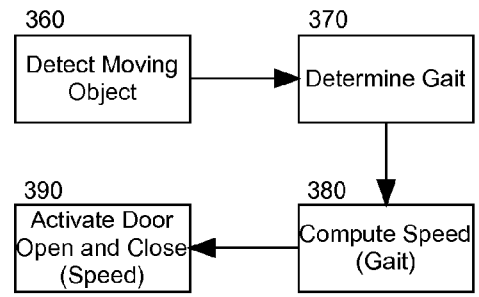

In yet further illustration of the operation of the door management module 300, FIGS. 3A and 3B, taken together, are a flow chart illustrating a process for managing an opening through gait recognition. Beginning in block 310 of FIG. 3A, a moving object can be detected and imagery of the moving object can be acquired. In block 320, an attempt can be made to determine the gait of the moving object, for example, by viewing the moving object in each frame of the imagery as a silhouette against a background and computing changes in a relative vertical position of the silhouette in each frame. In decision block 330, it can be determined if a gait is present and human in nature (as opposed to the gait of an animal such as a dog). If not, in block 340 an automatic door can be directed to open under the presumption that the moving object is a person in a wheeled vehicle and cannot readily open the door manually. Alternatively, the automatic door can be directed to enter a "disabled assist mode" in which the automatic door is opened to accommodate the passing through of a wheelchair. As yet an additional alternative, the same detection of gait can be used to raise or lower a screen at a kiosk in response to identifying a wheelchair user through gait detection. In any event, thereafter, the process can end in block 350.

Turning now to FIG. 3B, an alternate aspect of the embodiment of the invention is shown in which the speed at which an automated door is opened and closed is determined according to a detected gait of a moving object so as to conserve the cost of heating and/or cooling of a sealed space. In block 360 a moving object can be detected as the moving object approaches an automated door. In block 370 a gait can be determined for the moving object and in block 380, a speed of travel of the moving object can be estimated by the gait. Thereafter, in block 390 the automated door is both opened and subsequently closed according to the computed speed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for managing an opening through gait recognition, the method comprising:
    capturing imagery of a moving object as the moving object approaches an automated door;
    determining from the captured imagery a presence or absence of a gait of the moving object; and,
    managing an automated opening of the door according to the determined presence or absence of a gait of the moving object, a first action for the opening being undertaken in response to determining an absence of a gait in the captured imagery, a second action that differs from the first action for the opening being undertaken in response to determining a presence of a gait for the captured imagery.

2. The method of claim 1, wherein a Web cam captures the imagery.

3. The method of claim 1, wherein the presence or absence of a gait of the moving object is determined by computing changes in a vertical position of the moving object from frame to frame in the imagery.

4. The method of claim 1, wherein the automated door is opened in response to determining an absence of gait of the moving object.

5. The method of claim 1, wherein the automated door is opened more quickly in response to determining a fast gait of the moving object and more slowly in response to determining a slow gait of the moving object.

* * * * *